United States Patent [19]

Moser

[11] 4,105,589

[45] Aug. 8, 1978

[54] HYDRODESULFURIZATION CATALYST

[75] Inventor: William R. Moser, Wayland, Mass.

[73] Assignee: Exxon Research & Engineering Co., Linden, N.J.

[21] Appl. No.: 751,400

[22] Filed: Dec. 16, 1976

Related U.S. Application Data

[62] Division of Ser. No. 646,632, Jan. 5, 1976.

[51] Int. Cl.$^2$ .................. B01J 23/10; B01J 23/76; B01J 23/72; B01J 27/04
[52] U.S. Cl. .................... 252/462; 252/439
[58] Field of Search .............. 252/462, 439; 208/213, 208/216, 217; 106/73.2

[56] References Cited

U.S. PATENT DOCUMENTS

| | | | |
|---|---|---|---|
| 3,140,254 | 7/1964 | Plank et al. | 208/209 X |
| 3,322,491 | 5/1967 | Barrett et al. | 252/462 X |
| 3,345,286 | 10/1967 | Kovach et al. | 208/216 X |
| 3,682,836 | 8/1972 | Jaffe | 208/216 |
| 3,931,390 | 1/1976 | Palilla et al. | 252/462 X |
| 3,975,303 | 8/1976 | Eyles et al. | 252/462 |

FOREIGN PATENT DOCUMENTS 2,131,746 12/1971 Fed. Rep. of Germany ........... 252/462

*Primary Examiner*—W. J. Shine
*Attorney, Agent, or Firm*—Marthe L. Gibbons

[57] ABSTRACT

A catalyst is provided which comprises a hydrogenation component composited with a support. The hydrogenation component comprises a rare earth metal component and a transition metal component. Preferred catalysts are bimetallic catalysts consisting of cobalt and a rare earth metal on an alumina support. Also provided is a hydrodesulfurization process utilizing said catalyst.

10 Claims, No Drawings

HYDRODESULFURIZATION CATALYST

This is a division of application Ser. No. 646,632 filed Jan. 5, 1976.

BACKGROUND OF THE INVENTION

1. Field of the Invention

This invention relates to a catalyst and process for hydrodesulfurization of mineral oils. More particularly, this invention relates to a catalyst comprising a rare earth metal component and a transition metal component composited with a support.

2. Description of the Prior Art

Hydrodesulfurization processes in which heavy hydrocarbon distillates or residual fractions are hydrotreated with hydrogen in the presence of a catalyst comprising a hydrogenation component composited with a refractory oxide support, such as alumina, are well known (see for example U.S. Pat. No. 3,531,399; U.S. Pat. No. 3,569,044 and U.S. Pat. No. 3,770,618).

Catalysts comprising a rare earth metal component are also known.

It has now been found that a hydrodesulfurization catalyst comprising a rare earth metal component and a transition metal component composited with a support provides advantages that will become apparent in the following description.

SUMMARY OF THE INVENTION

In accordance with the invention there is provided, a process for the hydrodesulfurization of a sulfur-containing hydrocarbon oil which comprises contacting said oil under hydrodesulfurization conditions with hydrogen and a catalyst comprising a hydrogenation component and a support, said hydrogenation component comprising from about 1 to about 15 weight percent of a first metal component and from about 1 to about 5 weight percent of the second metal component, said first metal component being a rare earth metal component wherein the rare earth metal constituent of said component is selected from the group consisting of elements having atomic numbers ranging from 58 to 71 and wherein the metal constituent of the said second metal component is a non-rare earth metal selected from the group consisting of Groups IB, IIB, IIIB, IVB, VIB and VIII of the Periodic Table of Elements.

Furthermore, in accordance with the invention there is provided a catalyst comprising a hydrogenation component and a support, said hydrogenation component comprising from about 1 to about 15 weight percent of a first metal component and from about 1 to about 5 weight percent of a second metal component, said first metal component being a rare earth metal component wherein the rare earth metal constituent of said component is selected from the group consisting of elements having atomic numbers ranging from 58 to 71 and wherein the metal constituent of said second metal component is a non-rare earth metal selected from the group consisting of Group IB, Group IIB, Group IIIB, Group IVB, Group VIB and Group VIII of the Periodic Table of Elements.

DESCRIPTION OF THE PREFERRED EMBODIMENTS

A sulfur-containing heavy hydrocarbon feedstock is contacted in a hydrodesulfurization zone with hydrogen and a catalyst of the present invention under hydrodesulfurization conditions to produce a hydrocarbon product having a reduced content of sulfur.

HEAVY HYDROCARBON FEEDSTOCKS

The heavy hydrocarbon feedstocks utilized in the present invention comprise hydrocarbons boiling above 650° F. (343.33° C) at atmospheric pressure which contain substantial quantities of material boiling above 1,000° F. (537.78° C.). The process is particularly suited for treating heavy crude mineral oils, residual petroleum oil fractions, such as fractions produced by atmospheric and vacuum distillation of crude oils. Such residual oils usually contain large amounts of sulfur and metallic contaminants such as nickel and vanadium. The total metal content of such oils may range up to 2,000 weight parts per million or more and the sulfur content may range up to 8 weight percent or more. The Conradson carbon residue of these heavy hydrocarbon feeds will generally range from about 5 to 50 weight percent (as to Conradson carbon residue, see ASTM test D-189-65). The preferred process feedstock is a petroleum residuum obtained from distillation or other treating or separation process. From about 30 to about 100 percent of the petroleum residuum feed boils above 900° F. (482.22° C.) at atmospheric pressure. Other suitable feedstocks include heavy hydrocarbons recovered from tar sands; synthetic crude oils recovered from oil shales; heavy oils produced from the liquefaction of coal and the like, and mixtures of any of these feeds. The hydrocarbon feeds will generally contain at least 10 percent of materials boiling above 1,000° F. (537.78° C.) at atmospheric pressure.

OPERATING CONDITIONS IN THE HYDRODESULFURIZATION ZONE

The operating conditions in the hydrodesulfurization zone include a temperature ranging from about 100° C. (212° F.) to about 700° C. (1,382° F.), preferably a temperature ranging from about 300° C. (572° F.) to about 500° C. (932° F.), a hydrogen partial pressure ranging from about 1 atmosphere to about 10,000 psig, preferably from about 30 psig to about 1,000 psig, for example, about 175 psig; a liquid hourly space velocity ranging from about 0.5 volumes of hydrocarbon feed per hour per volume of catalyst to about 30 volumes of hydrocarbon feed per catalyst (V/V/Hr.), preferably from about 1.0 V/V/Hr. to about 5.0 V/V/Hr., and a hydrogen rate of about 2 to about 200 standard cubic feet per barrel of hydrocarbon feed.

THE HYDRODESULFURIZATION CATALYST

The hydrodesulfurization catalyst of the present invention utilized in the hydrodesulfurization zone comprises a hydrogenation component comprising a first metal component and a second metal component. The first metal component is a rare earth metal component selected from the group of elements having atomic numbers ranging from 58 to 71. The second metal component is a non-rare earth transition metal component. The metallic components are composited with a support.

Suitable rare earth metal components include the elemental rare earth metals or compounds, such as oxides, or sulfides of cerium, praseodymium, neodymium, promethium, samarium, europium, gadolinium, terbium, dysprosium, holmium, erbium, thulium, ytterbium, lutetium and mixtures thereof. Preferably, the rare earth metal constituent of the component is selected from the group having atomic numbers ranging from 59 to 71 and mixtures thereof. More preferably, the rare earth metal constituent of the component is selected from the group consisting of Pr, Nd, Sm, Eu, Gd, Dy, Er, Yb and mixtures thereof.

The rare earth metal component is present in the catalyst in an amount ranging from about 1 to about 15 weight percent, preferably from about 5 to about 15 weight percent, calculated as the elemental metal, based on the total catalyst.

The second metal component of the catalyst is an elemental metal or a compound such as an oxide or a sulfide of a non-rare earth transition metal selected from the group consisting of Groups IB, IIB, IIIB, IVB, VIB and VIII of the Periodic Table of Elements. The Periodic Table referred to herein is in accordance with the *Handbook of Chemistry and Physics* published by the Chemical Rubber Publishing Company, Cleveland, Ohio, 45th Edition, 1964. Preferably the second metal component is selected from the group consisting of Group VIB and Group VIII. More preferably, the second metal component is a Group VIII metal, that is, iron, cobalt or nickel. The second metal component may suitably be present in a catalyst in an amount ranging from about 1 to about 5 weight percent, preferably from about 1 to about 3 weight percent, calculated as the elemental metal, based on the total catalyst.

The preferred catalyst of the present invention is a bimetallic catalyst, that is, the hydrogenation component of the catalyst consists essentially of a rare earth metal component and the second metal component which is selected from a group other than a rare earth metal.

The support for the hydrogenation component may be any of the conventional supports, such as refractory oxides, for example, alumina, silica, silica-alumina. A preferred support is an alumina-containing support. A more preferred support is an alumina prepared by the thermal decomposition of aluminum alcoholates according to the method described in the publication J. L. Gass and S. J. Teichner in Bull. Soc. Chim., France, 1972 (6)2209–13, see also Ibid 1973 (2)429–35.

Generally, the method comprises a careful hydrolysis of an aluminum alcholate (for example, an aluminum butylate) to produce aluminum hydroxide followed by a thermal decomposition of the aluminum hydroxide in a solvent at a temperature above the critical temperature of the solvent. Suitable solvents include alcohols, preferably the lower boiling alcohols such as $C_1$ to $C_4$ alcohols, acetone, methylethyl ketone, cyclic ethers, tetrahydrofuran and the like. Suitable thermal decomposition temperatures range from above the critical temperature of the particular solvent used to about 980° C., preferably from about 700° C. to about 980° C.

The catalyst of the present invention is suitably prepared by impregnating the support with a solution of the salt of the first desired metal component, sintering the impregnated support, followed by impregnation of the sintered material with a solution of a salt of the second desired metal component, followed by sintering of the impregnated material. Thus, a sequential impregnation with intervening sintering is a preferred manner of preparing the catalyst. The following examples are presented to illustrate the invention.

EXAMPLE 1

Preparation of a cobalt-europium catalyst on eta-alumina (to be designated herein catalyst A) was carried out as follows: a commercially available eta-alumina (10 g; surface area about 110 m$^2$/g) was placed in a closed vapor saturation chamber with excess water at ambient temperature for 16 hours. Then a solution of 3.53 g of $Eu(NO_3)_3 \cdot 6H_2O$ dissolved in 6.5 g of water was impregnated into the water vapor treated sample of alumina. Following impregnation, the material was placed in a ceramic boat in a quartz tube contained in a tube furnace. Here it was heated at 88° C. for 1 hour under a stream of pure oxygen flowing at 20 ml/minutes. It was slowly heated over 2 hours to a temperature of 540° C. where it was held for 1 hour under the same oxygen flow. After cooling, the powder was again placed into the water vapor saturation chamber for 16 hours. Then 1.194 g of $Co(NO_3)_2 \cdot 6H_2O$ and 6.5 g of water was used to impregnate the above sintered solid utilizing an identical sintering procedure. The resultant surface area of this material was 85 m$^2$–g minus 1.

The following catalysts: Co—Pr, Co—Sm, Co—Nd, Co—Er, Co—Yb and Co—Dy were prepared in a similar manner and in similar concentrations. The catalysts were presulfided in a conventional manner prior to testing. A feed consisting of 5 percent dibenzothiophene in a hydrocarbon mixture was passed over the respective catalysts at 350° C., 175 psig hydrogen pressure, utilizing a liquid flow velocity of 3.3 V/V/Hr. and a hydrogen flow rate of 40 ml per minute. Another series of tests was made under similar conditions except for the temperature of the reaction zone was 450° C.

Results of the tests are summarized in Table I. Each of the catalysts designated catalysts A, D, E, F, G, H, I and J comprised 2.35 weight percent cobalt, calculated as the elemental metal based on the total catalyst, and 11.1 weight percent of the specified rare earth metal, calculated as the elemental metal based on the total catalyst.

TABLE I

COBALT - RARE EARTH METAL CATALYSIS OF DIBENZOTHIOPHENE DESULFURIZATION 175 psig hydrogen pressure,[a] 20 ml feed-hr$^{-1}$[b], 6.0 ml catalyst, presulfided with 15% $H_2S$ in $H_2$ at 400° C. for 1 hour. All conversions are rates after 3.0 hr. on feed.

| Catalyst | Surface Area (m$^2$/gm) | Density (gm/ml) | Specific Reactivity[e] (mol-sec$^{-1}$-m$^{-2}$) | Weight Reactivity[f] (mol-sec$^{-1}$-gm$^{-1}$) | Volume Reactivity[g] (mol-sec$^{-1}$-ml$^{-1}$) | Percent Feed Cracking |
|---|---|---|---|---|---|---|
| | | | Reaction Temperature 350° C. | | | |
| A. Co-Eu | 85 | 0.47 | 16.2 | 13.7 | 6.4 | 0 |
| B. Conventional Cat.[c] | 245 | 0.72 | 11.1 | 28.3 | 20.4 | 0 |
| C. Conventional Cat.[d] | 245 | — | 5.2 | 13.2 | 9.5 | 0 |
| D. Co-Pr | 76 | 0.54 | 5.4 | 4.1 | 2.2 | 0 |
| E. Co-Nd | 83 | 0.51 | 9.3 | 7.7 | 3.9 | 0 |
| F. Co-Sm | 81 | 0.52 | 9.5 | 7.7 | 4.0 | 0 |
| G. Co-Gd | 77 | 0.44 | 6.28 | 4.9 | 2.2 | 0 |
| H. Co-Dy | — | 0.44 | — | 0.23 | 0.1 | 0 |
| I. Co-Er | 74 | 0.51 | 3.7 | 2.7 | 1.4 | 0 |
| J. Co-Yb | 73 | 0.47 | 4.4 | 3.2 | 1.5 | 0 |

TABLE I-continued

| | | | | Reaction Temperature 450° C. | | | |
|---|---|---|---|---|---|---|---|
| A. | Co-Eu | 85 | 0.47 | 23.0 | 19.5 | 9.2 | 0.0 |
| B. | Conventional Cat.[c] | 245 | 0.72 | 11.6 | 29.6 | 20.3 | 4.7 |
| C. | Conventional Cat.[d] | 245 | — | 9.6 | 24.6 | 17.6 | — |
| D. | Co-Pr | 76 | 0.54 | 23.8 | 18.1 | 9.8 | 1.9 |
| E. | Co-Nd | 83 | 0.51 | 12.9 | 10.7 | 5.5 | 0.5 |
| F. | Co-Sm | 81 | 0.52 | 17.3 | 13.9 | 7.2 | 0.0 |
| G. | Co-Gd | 77 | 0.44 | 21.9 | 16.9 | 7.4 | 0.2 |
| H. | Co-Dy | — | 0.44 | — | 10.4 | 4.6 | 0.7 |
| I. | Co-Er | 74 | 0.51 | 5.9 | 4.3 | 2.2 | 0.0 |
| J. | Co-Yb | 73 | 0.47 | 10.8 | 7.9 | 3.7 | 0.0 |

[a]Hydrogen flow rate was 40 ml/min.
[b]Feed contained 5 wt. % dibenzothiophene, 2% dibenzyl, 10% diphenylmethane and 83% hexadecane.
[c]Results of best run.
[d]Average valve for 4 runs.
[e]Specific reactivity $\times 10^{-10}$
[f]Weight reactivity $\times 10^{-8}$
[g]Volume reactivity $\times 10^{-8}$ As can be seen from the data in Table I, the catalysts of the present invention were more active than the conventional prior art catalysts.

EXAMPLE 2

Another series of tests was conducted at atmospheric hydrogen pressure utilizing space velocity of 3.3 V/V/Hr. at 350° C. and at 450° C., respectively, with the same feed as the one utilized in Example 1, with a different set of catalysts.

Results of these tests are shown in Table II.

TABLE II

SPECIFIC REACTIVITY[a] OF TRANSITION METAL-NEODYMIUM DESULFURIZATION

| Catalyst[b] | Specific Reactivity[c] (mol-sec$^{-1}$-in$^{-2}$) | | Percent Cracking at 450° C. |
|---|---|---|---|
| | 350° C. | 450° C. | |
| B. Conventional | 2.6 | 0.29 | 9.1 |
| K. Alumina Support | 0 | 0 | 4.7 |
| L. 10% Nd on Alumina | 0.2 | 0.2 | 0.8 |
| M. Co-Nd | 1.1 | 0.5 | 0.0 |
| N. Ni-Nd | 4.6 | 1.3 | 0.6 |
| O. Fe-Nd | 0.0 | 0.0 | 0.0 |
| P. Cu-Nd | 0.0 | 0.0 | 0.0 |
| Q. In-Nd | 1.2 | 0.0 | 0.0 |
| R. Zn-Nd | 0.6 | 0.5 | 0.0 |

[a]Conditions were: presulfiding with 50% $H_2S$ in $H_2$ at 350° C. for 30 min.; runs were made using 6 ml of catalyst; liquid flow velocity of 3.3 V/V/hr.; a hydrogen flow rate of 75 ml/min.; atmos. press.
[b]All catalysts except B utilized pre-sintered alumina made according to method of Gass and Teichner referred to herein. Each of catalysts M to R comprised 11.1 wt.% Nd and 2.35 wt.% of the specified transition metal, calculated as the elemental metal based on the total catalyst.
[c]Specific reactivity $\times 10^{-10}$.

What is claimed is

1. A hydrodesulfurization catalyst consisting essentially of a hydrogenation component and a refractory oxide support, said hydrogenation component consisting essentially of from about 1 to about 15 weight percent of a rare earth metal component, said rare earth metal component being selected from the group consisting of at least one elemental metal selected from the group having atomic numbers 58 to 71, (a) metal oxides selected from the group consisting of oxides of Pr, Nb, Sm, Eu, Dy, Er and Yb or a metal sulfide of a rare earth metal selected from the group having atomic numbers 58 to 71 and from about 1 to about 5 weight percent of a non-rare earth metal component, said non-rare earth metal component being selected from the group consisting of at least one elemental metal, metal oxide and metal sulfide of a non-rare earth metal selected from the group consisting of Group IB, Group IIB, indium, Group VIB, and iron, cobalt and nickel of Group VIII of the Periodic Table of Elements.

2. The catalyst of claim 1 wherein said rare earth metal is selected from the group of elements having atomic numbers ranging from 59 to 71.

3. The catalyst of claim 1 wherein said non-rare earth metal is selected from the group consisting of elements of Group VIB and iron, cobalt and nickel of Group VIII.

4. The catalyst of claim 1 wherein said non-rare earth metal is selected from the group consisting of Co, Ni, Fe, Cu, In, and Zn.

5. The catalyst of claim 1 wherein said non-rare earth metal is cobalt.

6. The catalyst of claim 1 wherein said rare earth metal component is present in an amount ranging from about 5 to 15 weight percent, calculated as the metal, based on the total catalyst and wherein said non-rare earth metal component is present in an amount ranging from about 1 to 3 weight percent, calculated as the metal based on the total catalyst.

7. The catalyst of claim 1 wherein said hydrogenation component consists essentially of a rare earth metal component and a non-rare earth metal component selected from the group consisting of Group IB, Group IIB, Group VIB and Group VIII.

8. The catalyst of claim 1 wherein said hydrogenation component consists essentially of said rare earth metal component and a non-rare earth metal component selected from the group consisting of iron, cobalt and nickel.

9. The catalyst of claim 1 wherein said support is an alumina-containing support.

10. The catalyst of claim 1 wherein said support is alumina.

* * * * *